United States Patent [19]

Sakamoto

[11] Patent Number: 4,650,148

[45] Date of Patent: Mar. 17, 1987

[54] LOCKING DEVICE FOR A SEAT SUSPENSION

[75] Inventor: Takao Sakamoto, Akishima, Japan

[73] Assignee: Tachikawa Spring Co., Ltd., Tokyo, Japan

[21] Appl. No.: 773,887

[22] Filed: Sep. 9, 1985

[30] Foreign Application Priority Data

Sep. 28, 1984 [JP] Japan .................. 59-147168[U]

[51] Int. Cl.⁴ ........................................ F16M 13/00
[52] U.S. Cl. ............................... 248/561; 248/421; 248/423; 248/585
[58] Field of Search ............ 248/421, 423, 561, 585, 248/586, 587, 157; 297/346, 345, 338

[56] References Cited

U.S. PATENT DOCUMENTS

| | | | |
|---|---|---|---|
| 2,076,309 | 4/1937 | Whedon | 248/421 X |
| 2,091,088 | 8/1937 | Whedon et al. | 248/421 X |
| 2,383,173 | 8/1945 | Watter | 297/346 X |
| 2,614,608 | 10/1952 | Ardussi | 297/346 X |
| 3,327,985 | 6/1967 | Levit et al. | 297/345 X |
| 3,977,644 | 8/1976 | Sturhan | 248/423 X |
| 4,566,667 | 1/1986 | Yanagisawa | 248/421 X |

FOREIGN PATENT DOCUMENTS 906700  9/1962  United Kingdom ............... 297/338

Primary Examiner—Robert W. Gibson, Jr.
Assistant Examiner—David L. Talbott
Attorney, Agent, or Firm—Cushman, Darby & Cushman

[57] ABSTRACT

A locking device for a seat suspension provided in a seat for use in a vehicle such as an automobile is disclosed in which an upper frame attached to the seat proper side is supported via front and rear links to a lower frame fixed to the vehicle floor side in such a manner that it can be oscillated in a vertical direction relative to the lower frame, the upper frame is provided with engagement pins, and the lower frame is provided with lock plates engageable with the engagement pins. The lock plates are connected through link piece means with a shaft slidable longitudinally by an operation lever and also can be engaged with or disengaged from the engagement pins by the longitudinal sliding movements of the shaft. When the lock plates are engaged with the engagement pins, the link-piece means is connected with the shaft in a direction perpendicular thereto. Thus, when such a force is caused to act on the lock plates as to remove them from their respective engaged positions, such force will be applied through the link-piece means to the shaft perpendicularly, so that the engagement can be positively maintained.

2 Claims, 7 Drawing Figures

LOCKING DEVICE FOR A SEAT SUSPENSION

BACKGROUND OF THE INVENTION

1. Field of the Invention

The present invention relates to a locking device for a seat suspension in a vehicle seat.

2. Description of the Prior Art

Conventionally, in many of vehicle seats, especially the driver's seats, there is provided a seat suspension between the seat and the floor of the vehicle so that the seat can be maintained at a predetermined height level even when an occupant different in weight from an ordinary occupant is seated thereon, and also that vibrations produced during driving can be absorbed to improve the sitting feeling of the occupant. However, during running on bad roads or the like, such conventional seat suspension may rather cause the seat to vibrate excessively, which interferes with the occupant in driving operations. In order to solve this, there are proposed various kinds of seat suspensions each provided with a locking device which is capable of stopping the suspension function thereof as occasion demands, e.g., as disclosed in Japanese Patent Publication No. 144139 of 1982.

Specifically, the above-mentioned seat supension with a locking device, as shown in FIG. 7, comprises a lower frame (1) fixed to the floor side and an upper frame (2) attached to the seat proper S and supported resiliently to the lower frame (2) by means of X-shaped links (3) (4). The locking device comprises an engagement pin (5) provided in the upper frame (2) and a lock plate (6) journalled to the lower frame (1) correspondingly to the engagement pin (5), whereby the lock plate (6) can be engaged with the engagement pin (5) due to the biasing forces of a tension spring (7) to stop the suspension function of the suspension.

However, in the locking device of such conventional seat suspension, since the engagement of the lock plate (6) with the engagement pin (5) is retained only by the biasing forces of the tension spring (7), when excessive loads or heavy shocks are applied to the upper frame (2), there is a possibility of the engagement of the lock plate (6) with the engagement pin (5) being removed unexpectedly. Thus, such prior art locking device may cause the occupant uneasiness when the occupant is going to sit down onto the seat, that is, it lacks reliability in such time.

SUMMARY OF THE INVENTION

The present invention aims at eliminating the drawbacks found in the above-mentioned prior art locking devices.

Accordingly, it is a principal object of the invention to provide an improved locking device for a seat suspension which is simple in construction, is capable of locking the suspension function of the seat suspension positively, and can enjoy a high reliability of an occupant at the time of sitting.

In order to accomplish the above object, according to the invention, an engagement pin is provided in an upper frame of a seat suspension to which the invention is applied, a lock plate is journalled at its lower end to a lower frame of the seat suspension correspondingly to the engagement pin, a shaft which can be moved back and forth by means of operation of an operation lever is supported by a support frame fixed between the two side surfaces of the lower frame, a link piece is journalled at the one end thereof in the middle portion of the lock plate by a rod, with the other end thereof being connected to the rear end of the shaft by a connecting pin, and while the lock plate is in engagement with the engagement pin the connection angle of the link piece relative to the shaft is 90 deg., namely, the rod and the connecting pin are opposed perpendicularly to each other.

Therefore, while the lock plate is being spaced apart from the engagement pin, the upper frame is supported by front and rear links such that it can be swung vertically relative to the lower frame.

In this condition, if the operation lever is actuated to rotate the lock plate into engagement with the engagement pin, then the upper frame is locked such that it can not be swung relative to the lower frame and thus the suspension function of the seat suspension is caused to stop.

During such locked condition, since the connection angle $\theta$ of the link piece relative to the shaft is 90 deg., namely, the rod and the connecting pin are arranged such that thery are opposed to each other in a perpendicular direction, even if any force is applied to the lock plate in a direction to remove it from the engagement pin, such force will be applied to the connecting pin of the shaft perpendicularly via the link piece to prevent the shaft from sliding and thus to prevent the lock plate from rotating, so that the engagement of the lock plate with the engagement pin can be maintained. Therefore, the upper frame can be securely locked to the lower frame and there is no possibility of the engagement of the lock plate with the engagement pin being removed unexpectedly.

Other objects and advantages of the invention will become apparent from the following description of a preferred embodiment of the invention taken in connection with accompanying drawings.

DETAILED DESCRIPTION OF A PREFERRED EMBODIMENT OF THE INVENTION

Figure 1:
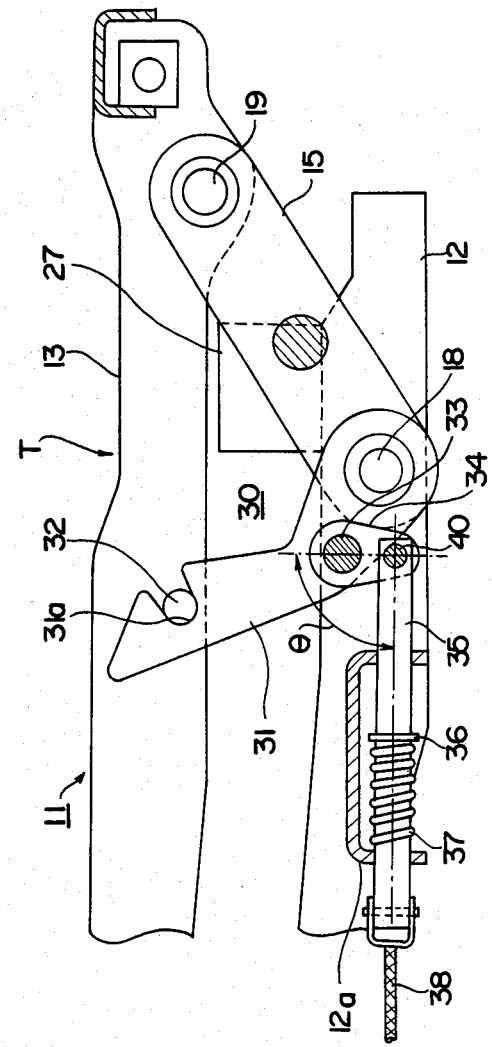
FIG. 1 is a longitudinally sectional side view of the invention.
Figure 2:
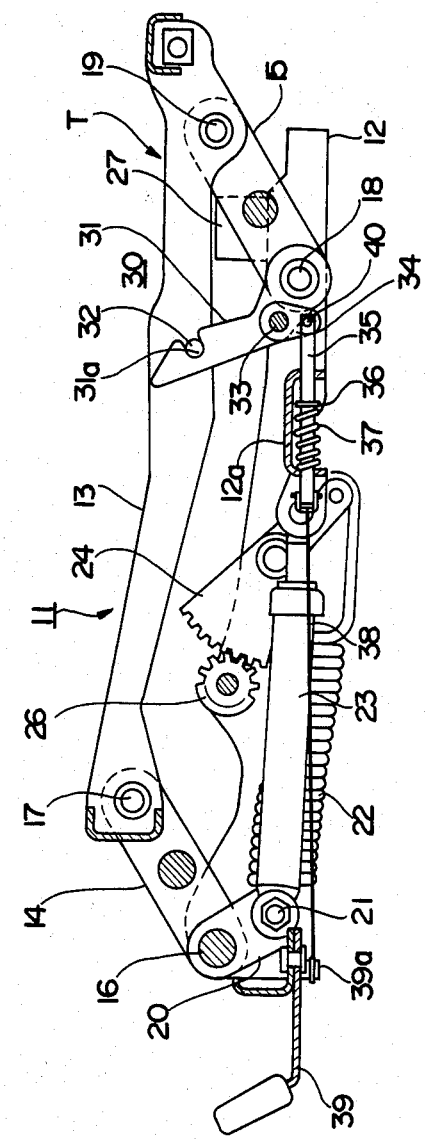
FIG. 2 is a longitudinally sectional side view of a seat suspension to which the invention is applied.

In the drawings, reference numeral (11) designates a seat suspension to which the invention is applied, (12) represents a lower frame to be fixed to the floor side of a vehicle, and (13) stands for an upper frame of the seat suspension to which a seat proper (not shown) is attached. The upper and lower frames (12), (13) are connected to each other by means of front links (14)(14) and rear links (15) (15) which are paired and are disposed in the forward and rearward portions of the upper and lower frames. Specifically, a rod (16) is journalled to the lower frame (12) between the front ends of the side portions thereof, the front links (14)(14) are fixed at their respective lower ends to the respective ends of the rod (16) with their respective upper ends being attached via shaft pins (17) (17) to the front ends of the two side portions of the upper frame (13), and the rear links (15)(15) are connected at their respective lower ends to the rear ends of the side portions of the lower frame (12) via shaft pins (18)(18) and at their respective upper ends to the rear ends of the side portions of the upper frame (13) via shaft pins (19) (19), whereby the upper frame (13), the front links (14) (14), the lower frame (12) and the rear links (15)(15) cooperate to form a parallel link mechanism so that the upper frame (13) can be supported variably in height relative to the lower frame (12) by means of inclination of the front links (14)(14) and the rear links (15)(15) of the above-mentioned parallel link mechanism.

Also, to the rod (16) are fixedly secured two arms (20)(20) which are respectively disposed adjacent and normal to the front links (14)(14), and to the respective tip ends of the arms (20)(20) are journalled pins (21)(21) to which tension springs (22)(22) and absorbers (23)(23) are secured at their first ends respectively while their respective second ends are secured to sector gears (24)(24) pivotally mounted to the two side portions of the lower frame and to a support frame (12a) extended between the rear portions of the two side portions of the lower frame (12).

The above-mentioned tension springs (22)(22) and absorbers (23)(23) enable the upper frame (13) to be resiliently supported onto the lower frame (12) through the front links (14)(14) and rear links (15)(15). The sector gears (24)(24) can be rotated via pinion gears (26)(26) by an adjustment device (25) to vary the tensile forces of the tension springs (22)(22) so as to adjust the support height of the upper frame (13).

Also, on the respective upper surfaces of the rear portions of the two side portions of the lower frame (12), there are mounted rubber stoppers (27)(27) for absorbing shocks to be given to the lower frame (12) by the upper frame (13) when the upper frame (13) is set at its lower-most position.

A locking device (30) constructed in accordance with the invention is provided in the rear portion of the above-described seat suspension (11).

Now, we will describe the locking device (30) of the invention in detail.

To the lower frame (12) are journalled two lock plates (31)(31) which are respectively disposed coaxially with the rear links (15)(15) and inclined in a direction contrary to the inclination of the rear links (15)(15) such that the lock plates (31)(31) can be freely rotated at the respective lower ends thereof independently of the rear links (15)(15). On the other hand, in the inner surfaces of the two side portions of the upper frame (13), there are provided two engagement pins (32)(32) respectively corresponding to notched engagement portions (31a)(31a) formed in the rear edges of the respective upper portions of the above-mentioned lock plates (31)(31). Each of the engagement pins (32)(32) is located in such a position that, as will be described later, when the lock plate (31) is engagement with this engagement pin (32), the lock plate (31), the rear link (15) and the rear portion of the upper frame (13) cooperate to form an inverted triangular truss structure T. Namely, in the illustrated embodiment, the engagement pin (32) is disposed in the central portion of each of the two side portions of the upper frame (13).

A rod (33) is journalled to and between the middle portions of the two lock plates (31)(31), and link-piece means (34) [(34a)(34b)] is being fitted at the first ends of the respective link pieces into the central portion of the rod (33).

Correspondingly to the link-piece means (34), a shaft (35) is fitted into and supported by the support frame (12a) such that it can be freely slided horizontally in the longitudinal direction thereof, the support frame (12a) extending between the middle portions of the two side portions of the lower frame (12). The shaft (35) is normally biased backwardly by a spring (37) which is compressed and interposed between the front side surface portion of the support frame (12a) and a retaining ring (36), while the front end portion of the shaft (35) is connected via a wire (38) to one of the side edges of an operation lever (39) attached to the lower surface of the front side portion of the lower frame (12), so that the shaft (35) can be slided back and forth by means of the rotational operation of the operation lever (39).

The lower ends of the link-piece means (34)[(34a)(34b)] are rotatably connected to the rear end of the shaft (35) by a connecting pin (40) such that they hold the shaft (35) from the two sides thereof between them.

The shaft (35) and link-piece means (34) are connected with each other in such a manner that, when the shaft (35) is positioned in its rear-most position and at the same time the lock plates (31)(31) are respectively in engagement with the engagement pins (32)(32), the connection angle $\theta$ of the shaft and link-piece means is 90 deg., namely, in such a manner that the rod (33) of the link-piece means (34) and the link piece connecting pin (40) of the shaft (35) are located perpendicularly to each other (see FIG. 1).

Next, we will describe the operation of the seat suspension provided with the thus-formed locking device.

Figure 3:
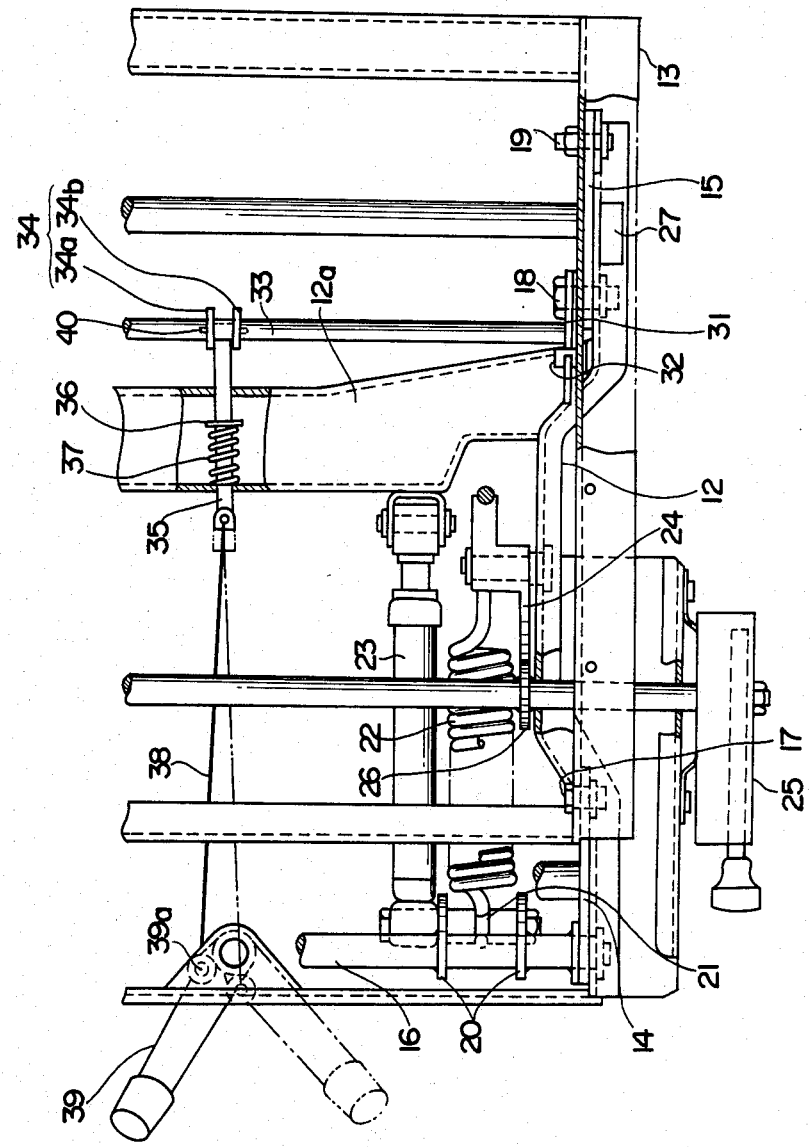
FIG. 3 is a partially cutaway plan view of a half section of the invention.
Figure 4:
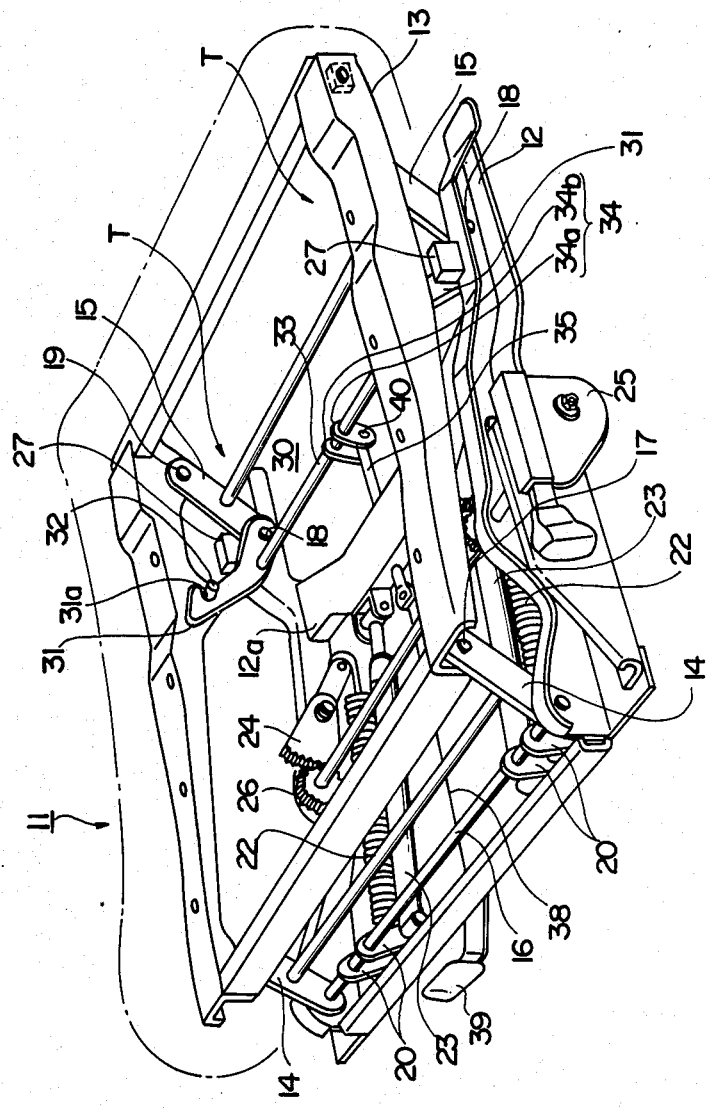
FIG. 4 is a perspective view of the invention.
Figure 5:
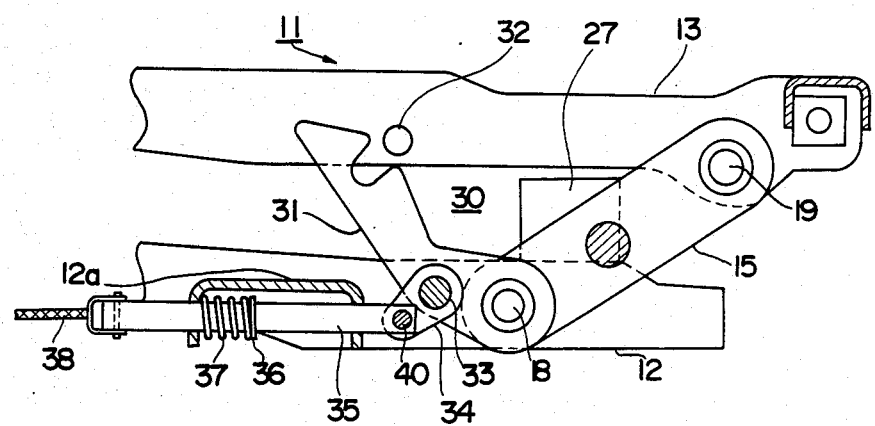
FIG. 5 is an explanatory view of operation of the invention.
Figure 6:
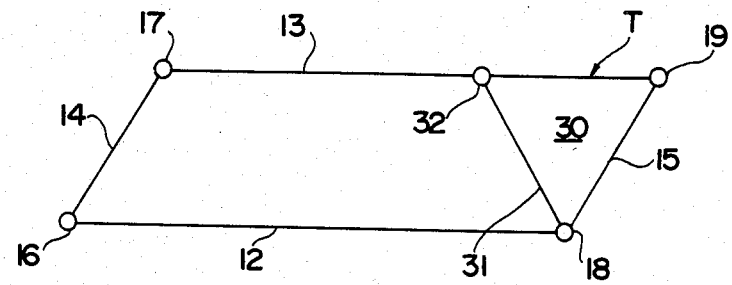
FIG. 6 is a schematic diagram of a seat suspension to which the invention is applied; and, FIG. 7 is a side view of a seat suspension provided with a conventional locking device.
Figure 7:
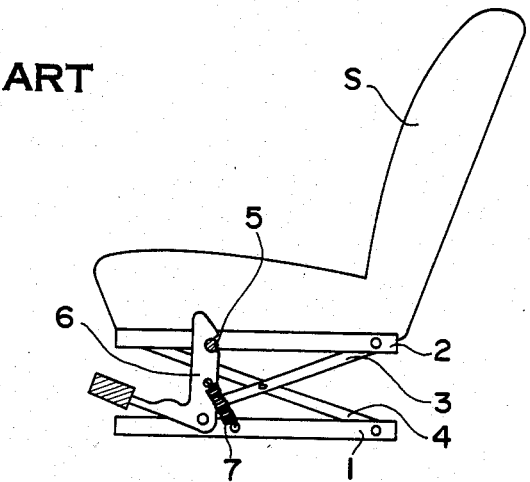

First, when it is operated as an ordinary suspension, the operation lever (39) is actuated to remove the engagement of the lock plates (31)(31) with the engagement pins (32)(32). That is, if the operation lever (39) is rotated from its one terminal rotation position to its other terminal rotation position, then the shaft (35) is pulled forwardly via the wire (28) (see two-dot chained lines in FIG. 3), and thereafter the lock plates (31)(31) are respectively rotated forwardly about the shaft pins (18)(18), via the link-piece means (34) connected to the rear end of the shaft (35), to remove the engagement portion (31a)(31a) thereof from the associated engagement pins (32)(32), so that the locked condition of the locking device or the seat suspension can be removed (see FIG. 5).

In this condition, since the connection portion (39a) of the operation lever (39) with the wire is situated at a position beyond a so-called dead point, the operation lever (39) is secured at this position due to the rearward biasing forces of the shaft (35) by means of the spring (37). As a result of this, the lock plates (31)(31) can be maintained separated from the engagement pins (32)(32), respectively.

Thus, in the unlocked condition, the upper frame (13) is supported in a resilient manner relative to the lower frame (12) by the absorbers (23)(23) and tension springs (22)(22).

When stopping the suspension function from this condition, the upper frame (13) is first set in a predetermined height to allow the two engagement pins (32)(32) to correspond to the engagement portions (31a)(31a) of the lock plates (31)(31), respectively, and then the operation lever (39) is returned to the one terminal rotation position to slide the shaft (35) rearwardly by the biasing forces of the spring (37). With this operation, the lock plates (31)(31) are rotated via the link-piece means (34) about the shaft pins (18)(18) in a rising manner to bring their respective engagement portions (31a)(31a) into engagement with the associated engagement pins (32)(32) so as to achieve the locking.

During this locked condition, since the connection angle θ of the link-piece means (34) with the shaft (35) is 90 degrees, namely, since the rod (33) of the link-piece means (34) and the connecting pin (40) of the shaft (35) are disposed perpendicularly to each other, when an excessive load is applied to the upper frame (13) and the resultant force acts on the lock plates (31)(31) to remove them from their locked positions, the removing force will be applied through the link-piece means (34) to the connecting pin (40) of the shaft (35) perpendicularly to the slidable direction of the shaft (35), namely, to the horizontal direction and thus the shaft (35) will never be slided, so that the lock plates (31)(31) will never be rotated to maintain their locked conditions relative to the associated engagement pins (32)(32).

Also, in such locked condition, since two truss structures are formed in the two side portions of the rear portion of the seat suspension (11) respectively by the lock plates (31)(31), the rear links (15)(15) and the side rear portions of the upper frame (13), as designated respectively by T, T in the drawings, the upper frame (13) is positively secured and fixed in both sides thereof relative to the lower frame (12) by the respective three nodal points, that is, the engagement pins (32)(32), shaft pins (18)(18) and shaft pins (19)(19), so that it is possible to prevent the upper frame (13) from becoming loose and also the thus-set locking will never be removed easily even when strong vibrations are given to the seat suspension.

As described above, in the seat suspension equipped with the locking device according to the invention, if the operation lever (39) is actuated according to demand, then the upper frame (13) can be locked into such position as unvibratable relative to the lower frame (12). During such locked condition, the seat suspension can be locked in a positive and secure manner so as to be able to enhance the stability and reliablity thereof at the sitting time.

In the illustrated embodiment of the invention, the lock plates (31)(31) are journalled coaxially with the journalled portions of the rear links (15)(15) on the lower frame side and also the locking device is formed in the rear portion of the seat suspension (11). However, for design reasons or the like, the lock plates (31)(31) may be journalled in the middle portions of the two side surface portions of the lower frame (12) and the locking device may be provided in the central portions of the seat suspension (11).

Also, in the illustrated embodiment, each of the lock plates (31)(31) is provided with only one engagement portion. But, a plurality of such engagement portions may be formed so as to be able to set the upper frame (13) into a plurality of locking positions stepwise.

As described hereinbefore, according to the invention, when the lock plates are respectively engaged with the engagement pins to lock the upper frame unvibratable relative to the lower frame, the link-piece means is so set that it is connected perpendicularly to the shaft. Thus, when the excessive load is applied to the upper frame to cause the force which acts on the lock plates in such a manner to remove the respective locked positions, this force will be applied via the link-piece means to the shaft perpendicularly. Therefore, the shaft will not be slided to maintain the engagement of the lock plates with the engagement pins and thus the upper frame can be locked positively relative to the lower frame. As a result of this, the invention can provide an improved seat suspension locking device which is highly reliable at the sitting time.

What is claimed is:

1. A locking device adapted for use with a seat suspension which includes a lower frame to be fixed to a vehicle floor and an upper frame to be attached to an underside of a seat, said upper frame being supported via front and rear links in a vertically movable manner relative to said lower frame, said locking device comprising:
    a plurality of engagement pins provided in said upper frame;
    a plurality of lock plates each having a middle portion, one end portion rotatably and pivotally connected to said lower frame, and another end portion provided with an engagement means for receiving one of said plurality of engagement pins;
    a support member provided in said lower frame;
    a shaft having end portions and being horizontally and slidably supported by said support member so as to be movable forwardly to a foremost position and rearwardly to a rearmost position of said seat suspension;
    a rod journalled to and between the middle portions of said plurality of lock plates;
    a link-piece having one end portion fitted to said rod and having another end portion pivotally connected to one of the end portions of said shaft;
    means, connected to said shaft, for biasing said shaft in a direction rearwardly of said seat suspension as well as in a direction in which said shaft is located perpendicularly relative to said link-piece when said shaft is positioned in its rearmost position; and
    a lever means, attached to said lower frame, for causing th forward and rearward movement of said shaft against the force of said biasing means;
    whereby, when said shaft is moved and positioned in its rearmost position and at the same time said plurality of lock plates are respectively engaged with said plurality of engagement pins, said link-piece is located perpendicularly relative to said shaft so that force is transmitted through the link-piece to the shaft perpendicularly and the shaft is consequently prevented from sliding horizontally.

2. The locking device for use with the seat suspension according to claim 1, wherein said lock plates are journalled coaxially with one of said front and rear links on the lower frame and, when said lock plates are engaged with said engagement pins, said lock plates, said front and rear links, and said upper frame form a truss structure.

* * * * *